United States Patent
Sakamoto et al.

(10) Patent No.: US 12,519,128 B2
(45) Date of Patent: Jan. 6, 2026

(54) METHODS FOR LOWERING THE HOT-PRESSING TEMPERATURES OF GARNET STRUCTURED IONIC CONDUCTORS

(71) Applicant: THE REGENTS OF THE UNIVERSITY OF MICHIGAN, Ann Arbor, MI (US)

(72) Inventors: Jeffrey Sakamoto, Ann Arbor, MI (US); Michael J. Wang, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 35 days.

(21) Appl. No.: 16/204,227

(22) Filed: Nov. 29, 2018

(65) Prior Publication Data

US 2019/0165414 A1     May 30, 2019

Related U.S. Application Data

(60) Provisional application No. 62/592,930, filed on Nov. 30, 2017.

(51) Int. Cl.

| | |
|---|---|
| *H01M 10/0562* | (2010.01) |
| *H01G 11/56* | (2013.01) |
| *H01G 11/84* | (2013.01) |
| *H01M 4/38* | (2006.01) |
| *H01M 10/0525* | (2010.01) |

(52) U.S. Cl.
CPC ....... *H01M 10/0562* (2013.01); *H01M 4/382* (2013.01); *H01M 10/0525* (2013.01); *H01G 11/56* (2013.01); *H01G 11/84* (2013.01)

(58) Field of Classification Search
CPC ............... C01G 25/006; H01M 4/382; H01M 10/0525; H01G 11/84; H01G 11/56
See application file for complete search history.

(56) References Cited

U.S. PATENT DOCUMENTS

| | | |
|---|---|---|
| 2013/0084505 A1 | 4/2013 | Iriyama et al. |
| 2014/0186720 A1 | 7/2014 | Kintaka |
| 2015/0099188 A1 | 4/2015 | Holme et al. |
| 2016/0133990 A1 | 5/2016 | Schwanz et al. |

FOREIGN PATENT DOCUMENTS

| | | |
|---|---|---|
| JP | 2015-050072 | 3/2015 |
| JP | 2016-027563 | 2/2016 |
| JP | 2016 056054 | 4/2016 |
| WO | 2017116599 A2 | 7/2017 |

OTHER PUBLICATIONS

J.L. Allen, J. Wolfenstine, E. Rangasamy, J. Sakamoto, Effect of substitution (Ta, Al, Ga) on the conductivity of Li7La3Zr2O12, J. Power Sources. 206 (2012) 315-319. doi:10.1016/j.jpowsour.2012. 01.131.

J.L. Caslavsky, D.J. Viechnicki, Melting behaviour and metastability of yttrium aluminium garnet (YAG) and YAlO3 determined by optical differential thermal analysis, J. Mater. Sci. 15 (1980) 1709-1718. doi:10.1007/BF00550589.

I.N. David, T. Thompson, J. Wolfenstine, J.L. Allen, J. Sakamoto, Microstructure and Li-Ion Conductivity of Hot-Pressed Cubic Li7La3Zr2O12, J. Am. Ceram. Soc. 98 (2015) 1209-1214. doi:10. 1111/jace.13455.

Y.X. Gao, X.P. Wang, W.G. Wang, Z. Zhuang, D.M. Zhang, Q.F. Fang, Synthesis, ionic conductivity, and chemical compatibility of garnet-like lithium ionic conductor Li5La3Bi2O12, Solid State Ion. 181 (2010) 1415-1419. doi:10.1016/i.ssi.2010.08.012.

J.B. Goodenough, Y. Kim, Challenges for Rechargeable Li Batteries†, Chem. Mater. 22 (2010) 587-603. doi:10.1021/cm901452z.

R.A. Huggins, Simple method to determine electronic and ionic components of the conductivity in mixed conductors a review, Ionics. 8 (2002) 300-313.

Irvine JTS, Sinclair DC, West AR (1990) Electroceramics: characterization by impedance spectroscopy. Adv Mater 2 (3):132-138. https://doi.org/10.1002/ adma.19900020304.

Y. Kim, H. Jo, J.L. Allen, H. Choe, J. Wolfenstine, J. Sakamoto, The Effect of Relative Density on the Mechanical Properties of Hot-Pressed Cubic Li7La3Zr2O12, J. Am. Ceram. Soc. 99 (2016) 1367-1374. doi:10.1111/jace.14084.

L.J. Miara, S.P. Ong, Y. Mo, W.D. Richards, Y. Park, J.-M. Lee, H.S. Lee, G. Ceder, Effect of Rb and Ta Doping on the Ionic Conductivity and Stability of the Garnet Li7+2x−y(La3−xRbx)(Zr2−yTay)O12 (0≤x≤0.375, 0≤y≤1) Superionic Conductor: A First Principles Investigation, Chem. Mater. 25 (2013) 3048-3055. doi:10.1021/cm401232r.

R. Murugan, V. Thangadurai, W. Weppner, Fast Lithium Ion Conduction in Garnet-Type Li7La3Zr2O12, Angew. Chem. Int. Ed. 46 (2007) 7778-7781. doi:10.1002/anie.200701144.

R. Murugan, W. Weppner, P. Schmid-Beurmann, V. Thangadurai, Structure and lithium ion conductivity of bismuth containing lithium garnets Li5La3Bi2O12 and Li6SrLa2Bi2O12, Mater. Sci. Eng. B. 143 (2007) 14-20. doi:10.1016/j.mseb.2007.07.009.

Oduncu "Development of a novel polymer-garnet solid state composite electrolyte incorporating Li—La—Zr—Bi—O and polyethylene oxide" 2016, Open Access Theses (Aug. 2016). Online <https://docs.lib.purdue.edu/cgi/viewcontent.cgi?article=1962&context=open_access_theses.

(Continued)

*Primary Examiner* — Milton I Cano
(74) *Attorney, Agent, or Firm* — Quarles & Brady, LLP

(57) ABSTRACT

Disclosed is a method for forming a solid state electrolyte. The method includes a first step of combining a solid comprising lithium, a second solid comprising lanthanum, a third solid comprising zirconium, and a fourth solid comprising bismuth to form a mixture. The method includes a second step of applying simultaneous heat and pressure to the mixture to form a ceramic material. The solid state electrolyte is ionically conducting and can be used as an electrolyte for an electrochemical device such as a battery or supercapacitor.

23 Claims, 11 Drawing Sheets

(56) References Cited

OTHER PUBLICATIONS

H. Peng, L. Xiao, Y. Cao, X. Luan, Synthesis and ionic conductivity of Li6La3BiSnO12 with cubic garnet-type structure via solid-state reaction, J. Cent. South Univ. 22 (2015) 2883-2886. doi:10.1007/s11771-015-2821-2.
H. Peng, Y. Zhang, L. Li, L. Feng, Effect of quenching method on Li ion conductivity of Li5La3Bi2O12 solid state electrolyte, Solid State Ion. 304 (2017) 71-74. doi:10.1016/j.ssi.2017.03.030.
E. Rangasamy, J. Wolfenstine, J. Sakamoto, The role of Al and Li concentration on the formation of cubic garnet solid electrolyte of nominal composition Li7La3Zr2O12, Solid State Ion. 206 (2012) 28-32. doi:10.1016/j.ssi.2011.10.022.
E. Rangasamy, J. Wolfenstine, J. Allen, J. Sakamoto, The effect of 24c-site (A) cation substitution on the tetragonal-cubic phase transition in Li7-xLa3-xAxZr2O12 garnet-based ceramic electrolyte, J. Power Sources. 230 (2013) 261-266. doi:10.1016/j.jpowsour.2012.12.076.
D.K. Schwanz, E. Marinero, Low Temperature Synthesis of Cubic-phase Fast-ionic Conducting Bi-doped Garnet Solid State Electrolytes, in: 2016, 1 page. http://adsabs.harvard.edu/abs/2016APS..MARH54010S.
J.-M. Tarascon, M. Armand, Issues and challenges facing rechargeable lithium batteries, Nature. 414 (2001) 359-367. doi:10.1038/35104644.
S. Teng, J. Tan, A. Tiwari, Recent developments in garnet based solid state electrolytes for thin film batteries, Curr. Opin. Solid State Mater. Sci. 18 (2014) 29-38. doi:10.1016/j.cossms.2013.10.002.
Thangadurai et al. "Li6ALa2Ta2O12 (A=Sr, Ba): Novel Garnet-Like Oxides for Fast Lithium Ion Conduction**" Adv. Funct. Mater. 2005, 15, No. 1, Jan. 1, 2005, pp. 107-112.
Thangadurai, et al."Recent progress in solid oxide and lithium ion conducting electrolytes research" Ionics 2006, 12, 81-92.
V. Thangadurai, S. Narayanan, D. Pinzaru, Garnet-type solid-state fast Li ion conductors for Li batteries: critical review. Chem. Soc. Rev. 43 (2014) 4714-4727. doi:10.1039/C4CS00020J.
T. Thompson, J. Wolfenstine, J.L. Allen, M. Johannes, A. Huq, I.N. David, J. Sakamoto, Tetragonal vs. cubic phase stability in Al-free Ta doped Li7La3Zr2O12 (LLZO), J. Mater. Chem. A. 2 (2014) 13431-13436. doi:10.1039/C4TA02099E.
T. Thompson, A. Sharafi, M.D. Johannes, A. Huq, J.L. Allen, J. Wolfenstine, J. Sakamoto, A Tale of Two Sites: On Defining the Carrier Concentration in Garnet-Based Ionic Conductors for Advanced Li Batteries, Adv. Energy Mater. 5 (2015) 1500096. doi:10.1002/aenm.201500096 (1-9 pages).
T. Thompson, S. Yu, L. Williams, R.D. Schmidt, R. Garcia-Mendez, J. Wolfenstine, J.L. Allen, E. Kioupakis, D.J. Siegel, J. Sakamoto, Electrochemical Window of the Li-Ion Solid Electrolyte Li7La3Zr2O12, ACS Energy Lett. 2 (2017) 462-468. doi:10.1021/acsenergylett.6b00593.
R. Wagner, D. Rettenwander, G.J. Redhammer, G. Tippelt, G. Sabathi, M.E. Musso, B. Stanje, M. Wilkening, E. Suard, G. Amthauer, Synthesis, Crystal Structure, and Stability of Cubic Li7-xLa3Zr2-xBixO12, Inorg. Chem. 55 (2016) 12211-12219. doi:10.1021/acs.inorgchem.6b01825.
Wang et al. "Dramatic reduction in the densification temperature of garnet-type solid electrolytes" Ionics, Springer-Verlag GmbH Germany, part of Springer Nature 2018, 10 pages, https://doi.org/10.1007/s11581-018-2464-z.
Wolfenstine J, Ratchford J, Rangasamy E et al (2012) Synthesis and high Li-ion conductivity of Ga-stabilized cubic Li7La3Zr2O12. Mater Chem Phys 134(2-3):571-575. https://doi.org/10.1016/j.matchemphys.2012.03.054.
Y. Xia, L. Ma, H. Lu, X.-P. Wang, Y.-X. Gao, W. Liu, Z. Zhuang, L.-J. Guo, Q.-F. Fang, Preparation and enhancement of ionic conductivity in Al-added garnet-like Li6.8La3Zr1.8Bi0.2O12 lithium ionic electrolyte, Front. Mater. Sci. 9 (2015) 366-372. doi:10.1007/s11706-015-0308-6.
Q. Xiao, J.J. Derby, Heat transfer and interface inversion during the Czochralski growth of yttrium aluminum garnet and gadolinium gallium garnet, J. Cryst. Growth. 139 (1994) 147-157. doi:10.1016/0022-0248(94)90039-6.
Xu, et al., "Mechanisms of Li+ transport in garnet-type cubic Li3+xLa3M2O12 (M=Te, Nb, Zr)" Phys. Rev. B 2012, 85, 052301-1-052301-5.
International Search Report and Written Opinion issued in corresponding PCT/US2018/063027, mailed Feb. 11, 2019, 8 pages.
Schwanz et al., "Ionic conductivity enhancements and low temperature synthesis of Li7La3Zr2O12 garnets by Bi aliovalent substitutions", arXiv:1902.06831, 2019.
JP 2016 056054 Machine Translation.
Miara et al., "First-Principles Studies on Cation Dopants and ElectrolytelCathode Interphases for Lithium Garnets", Chemistry of Materials, vol. 27, No. 11, Jun. 9, 2015, pp. 4040-4047.
Song et al., "High Li ion conductivity in a garnet-type solid electrolyte via unusual site occupation of the doping Ca ions", Materials & Design, vol. 93, Dec. 28, 2015, pp. 232-237.
Machine Translation of JP 2015-050072.
Machine Translation of JP 2016-027563.

METHODS FOR LOWERING THE HOT-PRESSING TEMPERATURES OF GARNET STRUCTURED IONIC CONDUCTORS

CROSS-REFERENCES TO RELATED APPLICATIONS

This application claims priority to U.S. Patent Application No. 62/592,930 filed Nov. 30, 2017.

STATEMENT REGARDING FEDERALLY SPONSORED RESEARCH

Not Applicable.

BACKGROUND OF THE INVENTION

1. Field of the Invention

This invention relates to electrochemical devices, such as lithium ion conducting solid-state electrolytes, solid-state lithium ion batteries, and solid-state lithium metal batteries. In one example embodiment, the lithium ion conducting solid-state electrolyte comprises $Li_6La_3ZrBiO_{12}$ (LLZBO) and is formed using hot-pressing techniques.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art (SOA) Li-ion technology is currently used in low volume production plug-in hybrid and niche high performance vehicles; however, widespread adoption of electrified powertrains requires 25% lower cost, 4 times higher performance, and safer batteries without the possibility of fire. One approach is to develop solid-state battery technology. Solid-state batteries offer the promise of 3-4 times the energy density compared to the SOA Li-ion batteries at a reduction in the pack cost of 20%.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including $Li_2PO_2N$ (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity >0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high Li ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit Li-ion conduction with the general formula $Li_{3+a}M_2Re_3O_{12}$ (where a=0-3, M=a metal with +4, +5, or +6 valence, and Re=a rare earth element with a +3 valence) [see, Xu, et al., *Phys. Rev. B* 2012, 85, 052301]. T. Thompson, A. Sharafi, M. D. Johannes, A. Huq, J. L. Allen, J. Wolfenstine, J. Sakamoto, *Advanced Energy Materials* 2015, 11, 1500096, identified which compositions, based on Li content, exhibit maximal Li-ionic conductivity. LLZO is a particularly promising family of garnet compositions.

It has been well established that the processing temperatures of LLZO must be above 1000° C. to achieve the high densities that are associated with high ionic conductivities. For the purposes of fabrication and incorporating garnet electrolytes into other systems, lower processing temperatures are desirable.

Therefore, what is needed is an improved method for the fabrication of a solid state electrolyte wherein the method dramatically lowers the densification temperature of garnet-structured solid state electrolytes, while maintaining comparable physical and electrochemical properties of previous garnet-structured solid state electrolytes.

SUMMARY OF THE INVENTION

The foregoing needs are met by the method and system provided in the present disclosure. The present disclosure provides a method of forming a solid state electrolyte using relatively low processing temperatures. The resulting electrolyte shows unexpectedly high relative densities and ionic conductivities when compared to similar electrolyte compositions formed using alternative methods.

It is one aspect of the invention to provide a method for the fabrication of a solid state electrolyte. The method includes a first step of combining a solid comprising lithium, a second solid comprising lanthanum, a third solid comprising zirconium, and a fourth solid comprising bismuth to form a mixture. The method includes a second step of applying simultaneous heat and pressure to the mixture to form a ceramic material. The ceramic material can have a stoichiometric chemical formula of $Li_{7-x}La_3Zr_{2-x}Bi_xO_{12}$, wherein x has a value between 0.01 and 1.99. In another embodiment of the invention, x has a value between 0.75 and 1. In another embodiment of the invention, x has a value of 1.

In the method, the step of applying simultaneous heat and pressure to the mixture may comprise using a hot-pressing technique, and the hot-pressing technique may use at least one of induction heating, indirect resistance heating, or direct hot-pressing. The temperature applied may be below at least one of 1000, 950, 900, 850, 800, 750, 700, or 650 degrees Celsius. In one embodiment of the invention, the temperature applied is below 900 degrees Celsius. The applied pressure may be between 5 and 80 MPa. In one embodiment of the invention, the pressure applied is between 40 and 60 MPa.

In the method, the first solid may comprise a lithium oxide or a lithium salt. In one embodiment of the invention, the first solid comprises lithium carbonate. The second solid may comprise a lanthanum oxide or a lanthanum salt. In one embodiment of the invention, the second solid comprises lanthanum hydroxide. The third solid may comprise a zirconium oxide or a zirconium salt. In one embodiment of the invention, the third solid comprises zirconium dioxide. The fourth solid may comprises a bismuth oxide or a bismuth salt. In one embodiment of the invention, the fourth solid comprises bismuth oxide.

In the method, the ceramic material can have a relative density above 90%. In one embodiment of the invention, the ceramic material has a relative density above 94%. The ceramic material can have a total ionic conductivity above 0.1 mS/cm. The ceramic material can have an ionic transference number of above 0.99990 when measured with chronoamperometry voltages between 2 and 10 Volts. The ceramic material can have a garnet-type or garnet-like crystal structure.

In the method, combining the solids may involve mixing dry powders. In one embodiment of the invention, the combining of the solids comprises cold-pressing and calcining the mixed dry powders. The calcining process may occur at temperatures between 500-1000 degrees Celsius for 2-8 hours. The simultaneous heat and pressure can be applied for less than 2 hours. The solids can be hot-pressed into a rectangular prism or cylindrical shape.

It is another aspect of the invention to provide an electrochemical device comprising a cathode, an anode, and the solid state electrolyte formed using the method described herein. The cathode may comprise a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. The anode may comprise a lithium host material selected from the group consisting of graphite, lithium titanium oxides, hard carbon, tin/cobalt alloy, and silicon/carbon. The anode may comprise lithium metal. The electrochemical device may include a lithium metal anode and a cathode comprising sulfur. The electrochemical device may include a lithium metal anode and a cathode comprising an air electrode.

These and other features, aspects, and advantages of the present invention will become better understood upon consideration of the following detailed description, drawings, and appended claims.

DETAILED DESCRIPTION OF THE INVENTION

Figure 1:
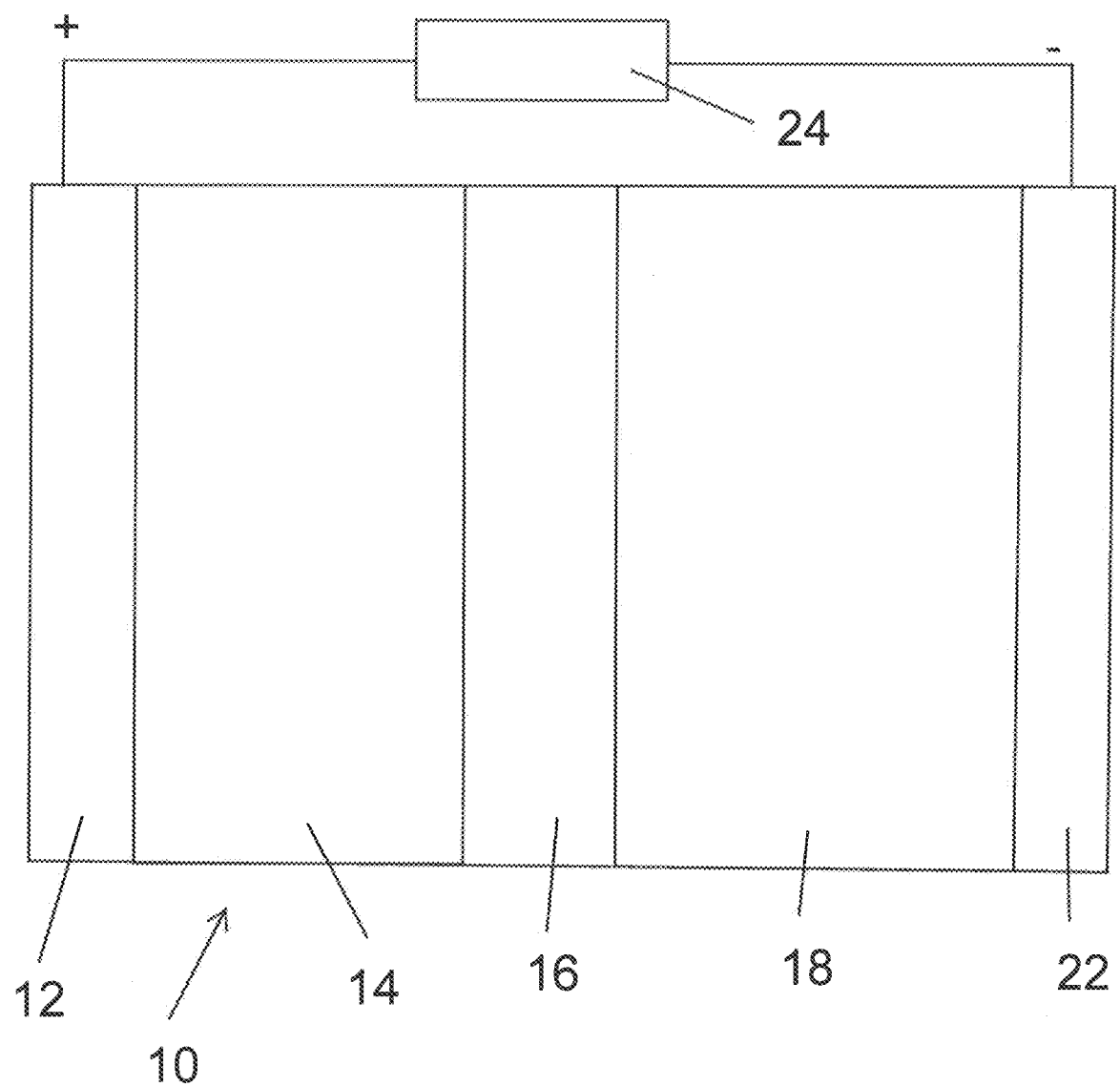
FIG. 1 is a schematic of a lithium ion battery.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

The present invention provides a method for forming a ceramic garnet based ionically conducting material that can be used as a solid state electrolyte for an electrochemical device such as a battery or supercapacitor.

In an aspect, the present disclosure provides a method for forming a solid state electrolyte. The method includes a first step of combining a first solid comprising lithium, a second solid comprising lanthanum; a third solid comprising zirconium, and a fourth solid comprising bismuth to form a mixture. The method includes a second step of applying simultaneous heat and pressure to the mixture to form a ceramic material.

The ceramic material may have a stoichiometric chemical formula of $Li_{7-x}La_3Zr_{2-x}Bi_xO_{12}$ wherein x has a value between 0.01 and 1.99. The ceramic material may have an x value between 0.75 and 1, between 0.95 and 1.05, or of 1.

A hot-pressing technique may be used to apply the simultaneous temperature and pressure to the solid mixture. The hot pressing technique may use at least one of induction heating, indirect resistance heating, or direct hot pressing. The applied temperature may be below at least one of 1000, 950, 900, 850, 825, 800, 775, 750, 725, 700, 675, or 650 degrees Celsius. The temperature applied may be specifically below 900 degrees Celsius. The applied pressure may be between 3 and 100 MPa, between 5 and 80 MPa, between 40 and 60 MPa, between 40 and 50 MPa, or specifically 47 MPa.

The first solid may comprise a lithium oxide or a lithium salt. For example, the first solid may comprise lithium carbonate. The second solid may comprise a lanthanum oxide or a lanthanum salt. For example, the second solid may comprise lanthanum hydroxide. The third solid may comprise a zirconium oxide or a zirconium salt. For example, the third solid may comprise zirconium dioxide. The fourth solid may comprise a bismuth oxide or a bismuth salt. For example, the fourth solid may comprise bismuth oxide.

The ceramic material may have a relative density above at least one of 75%, 80%, 85%, 88%, 89%, 90%, 91%, 92%, 93%, 94%, 95%, 96%, 97%, 98%, or 99%. For example, the ceramic material may specifically have a relative density above 94%. The ceramic material may have a total ionic conductivity above at least one of 0.01, 0.1, 0.2, 0.3, 0.4, 0.5, 0.6, 0.7, 0.8, 0.9, 1, 2, 5, or 10 mS/cm. For example, the ceramic material may have a total ionic conductivity above 0.1 mS/cm. The ceramic material may have an ionic transference number above 0.99990 when measured with chronoamperometry voltages between 2 and 10 Volts. The ceramic material may have a garnet-type or garnet-like crystal structure. In one form, the ceramic material has the space group $la\bar{3}d$.

The method step of combining the solids may comprise mixing dry powders. The method step of combining the solids may comprise cold-pressing and calcining the mixed dry powders. The calcining process may occur at temperatures between 500 and 1000 degrees Celsius for 2 to 8 hours.

The solids may be hot-pressed into a rectangular prism or cylindrical shape. The simultaneous heat and pressure may be applied for less than at least one of 0.2, 0.5, 1, 1.5, 2, 3, 4, 6, 8, 10, or 12 hours.

In another aspect, the present disclosure provides for an electrochemical device comprising a cathode, an anode, and a solid-state electrolyte that was formed using the method described herein.

The cathode of the electrochemical device may comprise a lithium host material selected from the group consisting of lithium metal oxides wherein the metal is one or more aluminum, cobalt, iron, manganese, nickel and vanadium, and lithium-containing phosphates having a general formula $LiMPO_4$, wherein M is one or more of cobalt, iron, manganese, and nickel. The anode may comprise a lithium host material is selected from the group consisting of graphite, lithium titanium oxides, hard carbon, tin/cobalt alloy, and silicon/carbon. The anode may comprise a lithium metal. The electrochemical device may include a lithium metal anode and a cathode comprising sulfur. The electrochemical device includes a lithium metal anode and a cathode comprising an air electrode.

In one non-limiting example application, a solid state electrolyte formed using the methods of the invention is used in a lithium ion battery as depicted in FIG. 1. The lithium ion battery 10 of FIG. 1 includes a current collector 12 (e.g., aluminum) in contact with a cathode 14. A solid state electrolyte 16 formed using the methods of the invention is arranged between the cathode 14 and an anode 18, which is in contact with a current collector 22 (e.g., aluminum). The current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$(LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

A suitable active material for the anode 18 of the lithium ion battery 10 is a lithium host material capable of incorporating and subsequently releasing the lithium ion such as graphite, lithium titanium oxide, hard carbon, a tin/cobalt alloy, or silicon/carbon. The anode active material can be a mixture of any number of these anode active materials.

Figure 2:
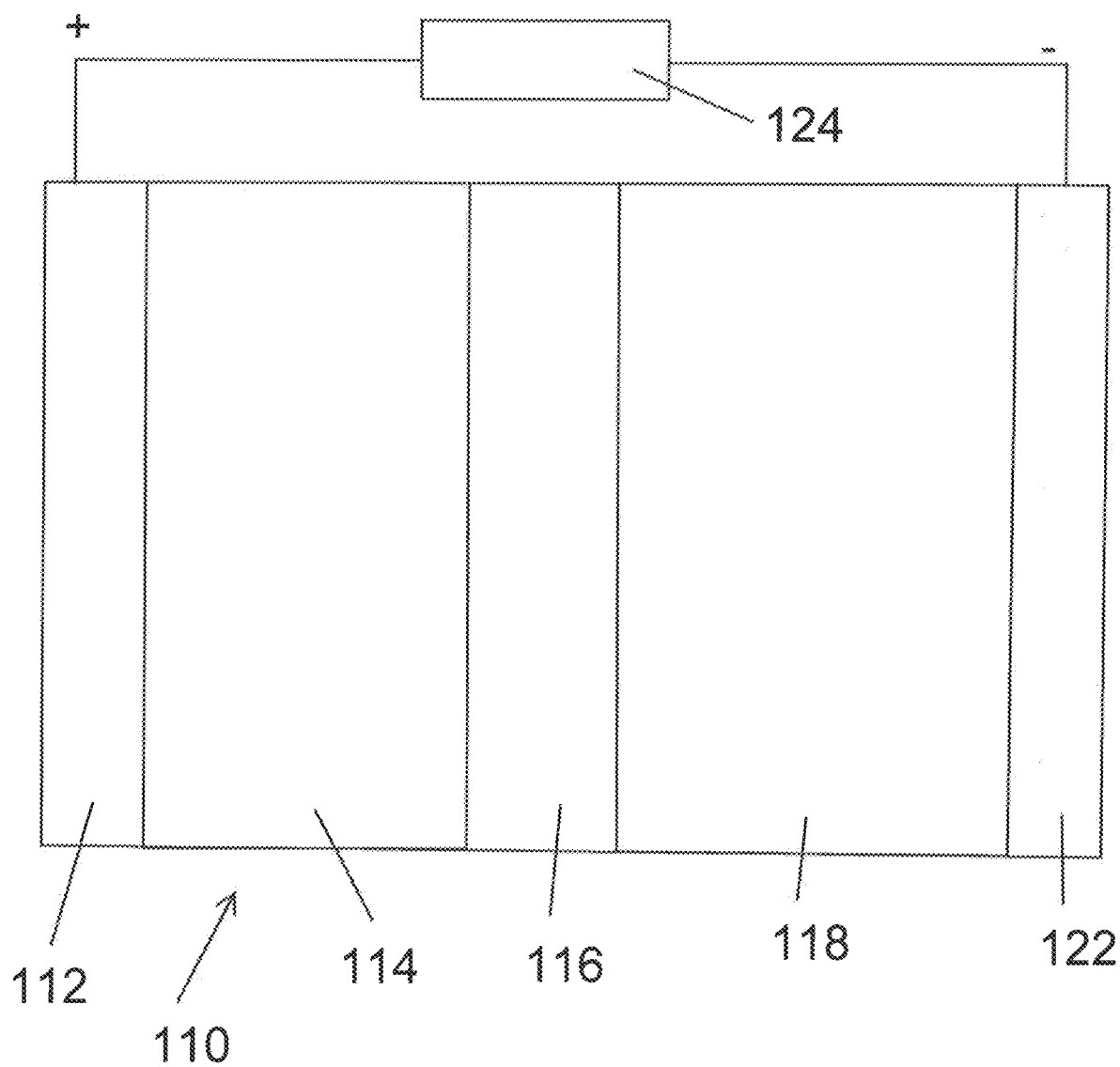
FIG. 2 is a schematic of a lithium metal battery.

In another non-limiting example application, a solid state electrolyte formed using the methods of the invention is used in a lithium metal battery as depicted in FIG. 2. The lithium metal battery 110 of FIG. 2 includes a current collector 112 in contact with a cathode 114. A solid state electrolyte 116 formed using the methods of the invention is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above, or porous carbon (for a lithium air battery), or a sulfur containing material (for a lithium sulfur battery). A suitable active material for the anode 118 of the lithium metal battery 110 is lithium metal.

Certain garnet based ceramic materials are useful for forming solid state electrolytes. The garnet phase of the ceramic material exhibits fast ion conduction similar to prior LLZO phases. The room temperature total Li ionic conductivity of the ceramic material can be 0.1 mS/cm or higher. This is close to the reported values for conventional Al doped LLZO (0.3-0.4 mS/cm).

Example

The following example is provided in order to demonstrate and further illustrate certain embodiments and aspects of the present invention and is not to be construed as limiting the scope of the invention.

Overview

In recent years, there has been a growing interest in the garnet structured $Li_7La_3Zr_2O_{12}$ (LLZO) solid electrolyte due to its unprecedented combination of high ionic conductivity, stability against Li metal, and moderate stability in air [Ref. 1-3]. These properties make LLZO a suitable material for Li-ion solid state and Li—S batteries to meet the high energy density requirements that future energy storage applications demand [Ref. 4, 5]. As only the cubic polymorph of LLZO exhibits superionic conductivity, there has been significant effort in studying the effects of various dopants, like Al, Ta, and Nb in the garnet structure [Ref. 6-9]. It has been shown by Xia et al. that a partial substitution of $Bi^{5+}$ on the $Zr^{4+}$ octahedral site can also stabilize the cubic phase [Ref. 10]. The Bi garnet, $Li_5La_3Bi_2O_{12}$ (LLBO), has been characterized as well and is shown to exhibit relatively low ionic conductivities compared to LLZO [Ref. 11-13]. Although the conductivity is lower, Bi garnets have exhibited significantly lower calcination and sintering temperatures, in the range of 600° C.-900° C. [Ref. 12-15]. In comparison, traditional LLZO requires processing temperatures above 1000° C. for the cubic garnet structure to form, and even higher to achieve the high densities required for high ionic conductivity. In more recent studies, it has been observed that garnets of the composition $Li_{7-x}La_3Zr_{2-x}Bi_xO_{12}$ (LLZBO) also exhibit these low processing temperatures [Ref. 10, 16-18]. Not only does the Bi substitution stabilize the cubic phase, but also significantly lowers the densification temperature.

Currently there are few studies that focus on the properties and behavior of this system. Existing studies have looked at the properties of sintered LLZBO, however, it is known that the processing methods of LLZO have a significant impact on the ionic conductivity of the material, due to grain boundary resistance [Ref. 19, 20]. It has been seen with LLZO that high density pellets fabricated by hot-pressing exhibit significantly higher ionic conductivity and critical current densities compared to pressure-less sintering approaches [Ref. 19-21].

We suspected that the simultaneous application of temperature and pressure of LLZBO would improve grain boundary contact and adhesion, which results in significantly lower grain boundary impedance. Therefore, we believed that using such manufacturing methods may not only improve the total conductivity, but also reduce the sintering time, create a more uniform microstructure, and improve the mechanical properties.

The focus of this experiment was to demonstrate the synthesis of phase pure LLZBO with high (>90%) relative densities than can be achieved by pressure-assisted densification. A Bi concentration of above 0.2 may stabilize the cubic phase, and fast Li-ion transport may be seen with Bi concentrations between 0.75 and 1.0 [Ref. 16].

LLZBO of the nominal composition $Li_6La_3ZrBiO_{12}$ was the focus of this work. The effect of hot-pressing temperature and pressure on the relative density and phase purity was investigated. A potential mechanism for the low densification temperatures was also investigated. Using a combination of AC and DC methods, the ionic and electronic impedance/resistance of high density LLZBO were measured. Overall, using a variety of materials characterization techniques, including x-ray diffraction, scanning electron microscopy, and Raman spectroscopy, this study presents the first investigation of LLZBO fabricated by a hot-pressing approach and that Zr-based LLZO can be densified to >90% relative density below 900° C.

In the study of this Example, $Li_6La_3ZrBiO_{12}$(LLZBO) was prepared by a rapid-induction hot-pressing technique and characterized using a variety of techniques, including x-ray diffraction, scanning electron microscopy, and Raman spectroscopy. We demonstrated in this Example the ability to synthesize phase pure LLZBO with higher relative densities (~94%) than can be achieved by pressure-less sintering methods, at pressing temperatures of only 850° C. The ionic conductivity was measured to be 0.1 mS/cm, which is comparable to the best reported conductivities of high density LLZO. This demonstrates the ability to fabricate dense, phase pure, and high conductivity LLZBO at temperatures significantly lower than other garnet compositions, which will prove useful for scalability and reducing reactivity with cathodes during densification.

EXPERIMENTAL

Materials Synthesis and Processing

LLZBO with the composition $Li_6La_3ZrBiO_{12}$ was synthesized by a solid state synthesis technique. $Li_2CO_3$ (1 μm, Alfa Aesar, Ward Hill, Massachusetts, USA), $La(OH)_3$ (1 μm, Alfa Aesar, Ward Hill, Massachusetts, USA), $ZrO_2$ (30-60 nm, Inframat, Advanced Materials, Manchester, Connecticut, USA), and $Bi_2O_3$ (80-200 nm, Alfa Aesar, Ward Hill, Massachusetts, USA) were used as starting precursors. The precursors were weighed in the stoichiometric amounts and dry-milled in a planetary ball mill (PM 100; Retsch, Haan, Germany). An excess 30 wt % of $Li_2CO_3$ was added to account for Li volatilization during calcination. The resulting mixture was cold-pressed and calcined in air at 800° C. for 4 hours. The calcined pellets were reground, cold pressed, and calcined again at 800° C. for 4 hours. This process was repeated twice and a 20 wt % excess of $Li_2CO_3$ was added each time to account for Li volatilization. The final LLZBO powder was formed into pellets by a rapid induction hot-pressing technique as described by Rangasamy et al [Ref. 21]. The powder was pressed in a graphite die at 47 MPa and at temperatures between 750° C. and 950° C. The resulting pellets were cut into 1.5±0.2 mm disks on a diamond saw and polished with various sandpapers and diamond pastes to a final polish using 0.1 μm diamond paste.

Materials Characterization

X-ray diffraction was performed using a Rigaku Miniflex 600 X-ray diffractometer, using Cu Kα radiation over a 2θ range of 15° to 65° with a 0.02° step size.

Microstructural and energy dispersive x-ray spectroscopy (EDS) analysis was performed on a Tescan MIRA3 GMU FEG scanning electron microscope.

The conductivity of the material was measured using electrochemical impedance spectroscopy (EIS) and DC polarization methods, on a Biologic VMP-300 galvanostat/potentiostat. EIS was performed from 1 Hz to 7 MHz with a perturbation of 100 mV at room temperature and sputtered Au blocking electrodes. The DC polarization method used was staircase potentiometry (Mott-Schottky), with 1.0V steps over a range from 3.5 V to 8.5 V vs Li/Li+.

Raman spectroscopy was performed on a Horiba Micro Raman Spectrometer using a 532 nm laser, 1800 lines per mm holographic grating, and 50× magnification at room temperature.

Thermomechanical analysis (TMA) was performed using a TA Instruments Q400 Thermomechanical Analyzer. For performing TMA, calcined powders were cold pressed into a pellet under 150 kPa of pressure. The pellet was loaded under 0.8 N and heated to 850° C. at a rate of 5°/min in an Ar atmosphere. Due to the fact that the LLZBO is likely to react with most available crucibles used for thermal analysis, a "pseudo-dilatometry" experiment was used to estimate the melting temperature. A cold pressed pellet of LLZBO powder was loaded into a graphite die and heated while under pressure. A constant pressure of 16 MPa was applied while heating from room temperature to 1300° C. at a rate of 120° C.·min$^{-1}$. Extrusion of molten powder was observed to correlate to a drastic increase in the strain and the corresponding temperature was estimated to be the melting temperature.

Results

X-Ray Diffraction

Figure 3:
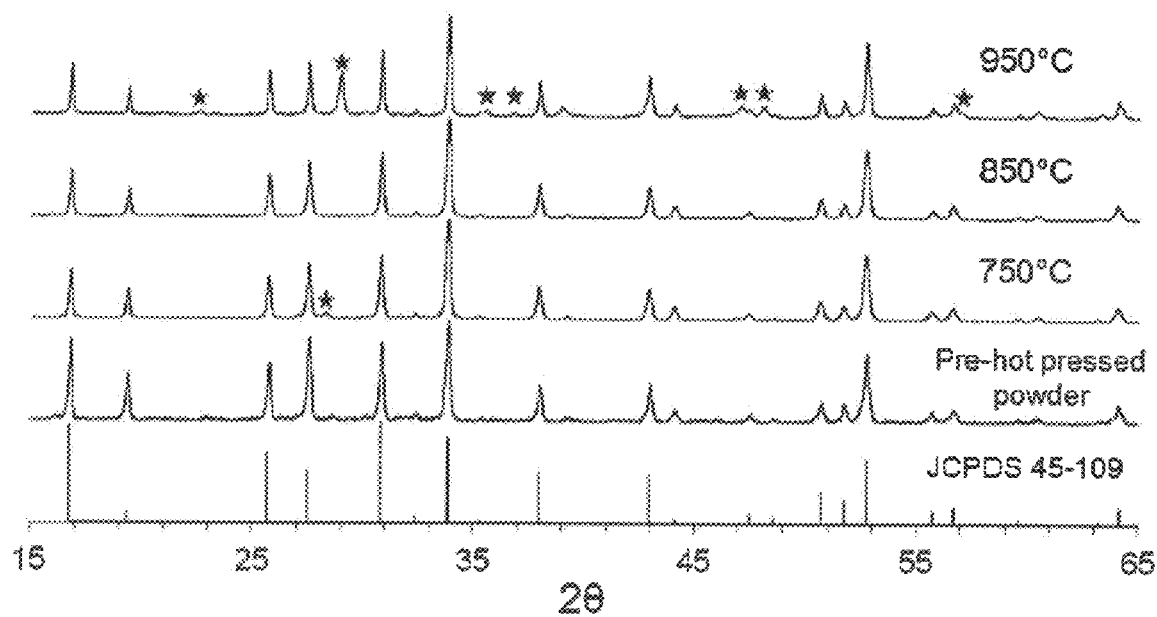
FIG. 3 depicts experimental X-ray diffraction spectra of pre-hot pressed powder and pellets hot-pressed at 750° C., 850° C., and 950° C. Markers indicate peaks belonging to the Li-deficient pyrochlore phase.

X-ray diffraction was conducted for three different hot-pressing temperatures and is shown in FIG. 3. The samples for each hot pressing temperature exhibit a clear display of the cubic garnet structure, shown as a reference in FIG. 3. The partial substitution of Bi stabilizes the cubic phase as no tetragonal garnet is evident [see Ref. 16]. The lattice parameter was calculated based on the XRD spectra of the phase pure 850° C. sample. The calculated lattice parameter of 13.036 Å shows an increase from the lattice parameter of cubic LLZO, 12.980 Å. This is to be expected considering the relative size of Bi$^{5+}$ compared to Zr$^{4+}$. Trace impurities can be observed for the calcined powder as well as the lower temperature samples. The 950° C. hot pressed sample exhibits a significant amount of impurities, primarily the Li deficient pyrochlore phase indicated by the markers in FIG. 3. As seen with other garnet systems, Li volatilizes more easily at higher temperatures resulting in the significant fraction of pyrochlore in the 950° C. hot-pressed sample. Although slightly higher densities may be achieved, the faster Li volatilization rates make it more difficult to achieve good phase purity. Additionally, the most attractive feature of this composition of LLZBO is its low densification temperature and so there is little interest in studying temperatures above 950° C. in this work. From the XRD spectra and density calculations presented here, it is clear that both good phase purity and relatively high densities can be achieved at 850° C.

Density Analysis

Previous reports on compositions of LLZBO have reported up to 90% relative densities by pure pressure-less sintering, as measured by the Archimedes method or by gas pycnometry. However, it was observed that high densities could not be achieved by pressure-less sintering alone, as measured by geometric density calculations. SEM analysis suggests that at lower densities, there is a percolated network of pores throughout the material ending at the surfaces, which may be accessible to the fluids used for these methods. For these reasons, we believe the geometric density may provide a more accurate value for the relative densities. From the geometric dimensions of the hot-pressed pellets, it was calculated that the relative densities for the 750° C., 850° C., and 950° C. samples are 90%, 94%, and 98% respectively. Even at the lowest hot-pressing temperature, the relative density reported here is higher than any reported in the literature. For the more common dopants such as Al, Ta, or Nb, to achieve similar densities requires hot-pressing temperatures above 1000° C. [Ref. 6, 8, 19, 20].

Figure 4:
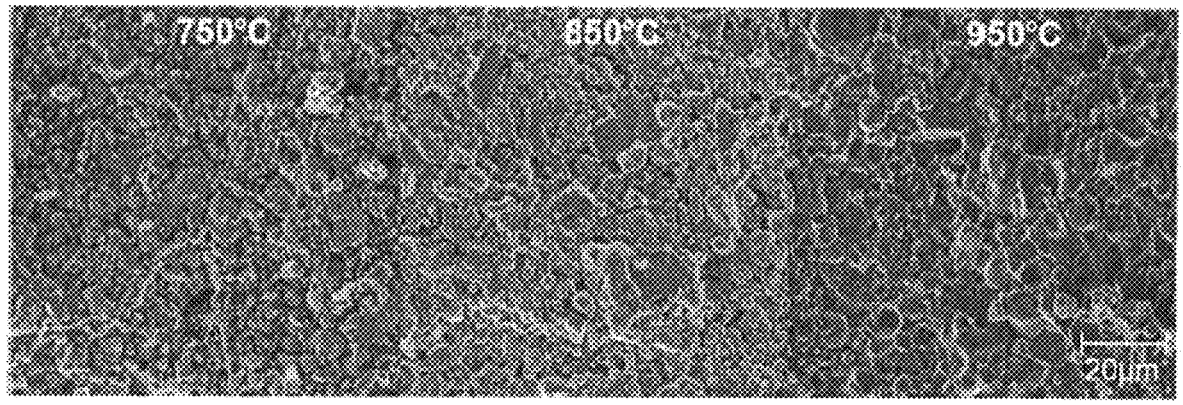
FIG. 4 shows scanning electron microscope (SEM) images of fractured surfaces of LLZBO pellets hot-pressed at 750° C., 850° C., and 950° C.

FIG. 4 shows SEM images of fracture surfaces of each sample and the observed microstructures seem consistent with the calculated relative densities. It was observed that there is increasing grain boundary adhesion and decreasing porosity with increasing hot-pressing temperatures. Although intergranular fracture was observed for all three temperatures, there was increasing evidence of intragranular fracture with increasing temperature. Even at the lowest temperature there was still evidence of intragranular fracture, which is a good example of the strong grain boundary adhesion that can be achieved by a technique such as hot-pressing, as observed by Kim et al [Ref. 20].

Energy Dispersive X-Ray Spectroscopy

Figure 5:
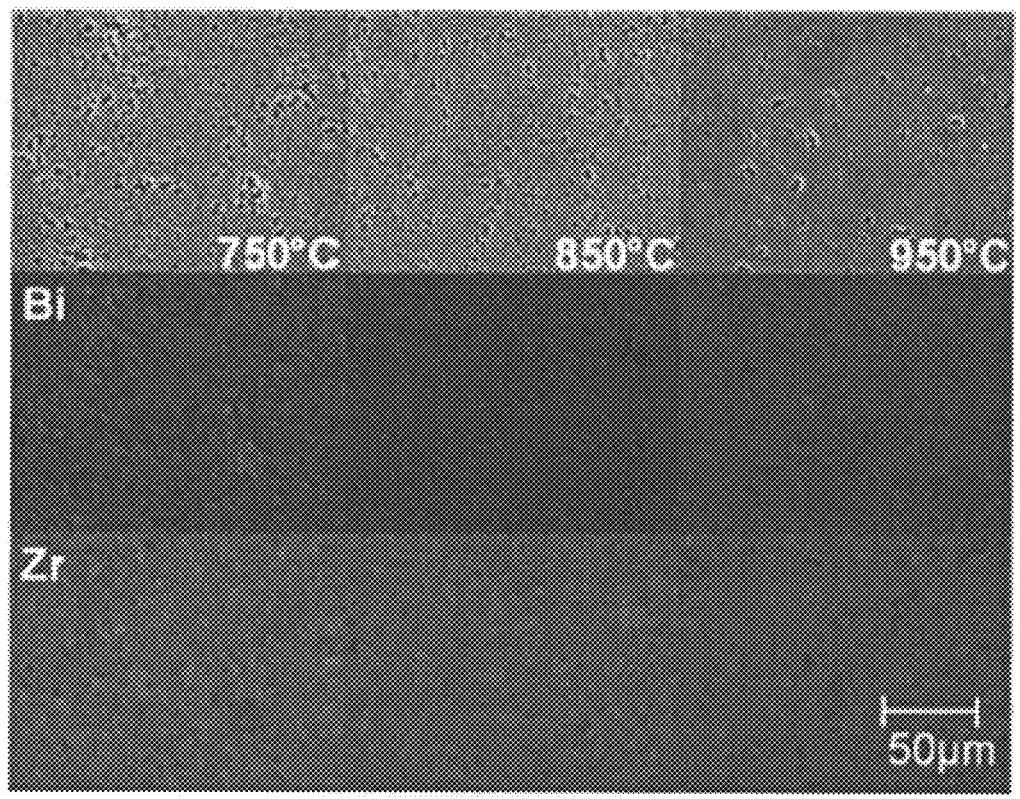
FIG. 5 shows experimental energy dispersive x-ray spectroscopy maps showing the distribution of Bi and Zr on the polished surface of LLZBO pellets hot-pressed at 750° C., 850° C., and 950° C.

Energy dispersive x-ray spectroscopy (EDS) was conducted on a polished surface of a hot-pressed pellet. The secondary electron images of each sample also seem consistent with the reported trend in the relative density as a function of temperature. FIG. 5 shows the elemental maps for Zr and Bi. On all imaged samples, both the Zr and Bi maps are homogeneous and no major phase separation was observed. The uniform distribution of both Zr and Bi suggests that the Bi is indeed substituting into the LLZO structural framework, as opposed to forming separate regions of LLZO and LLBO. This is also consistent with the increase in lattice parameter observed in XRD analysis and the Raman spectroscopy analysis discussed in the next section.

Raman Spectroscopy

Figure 6:
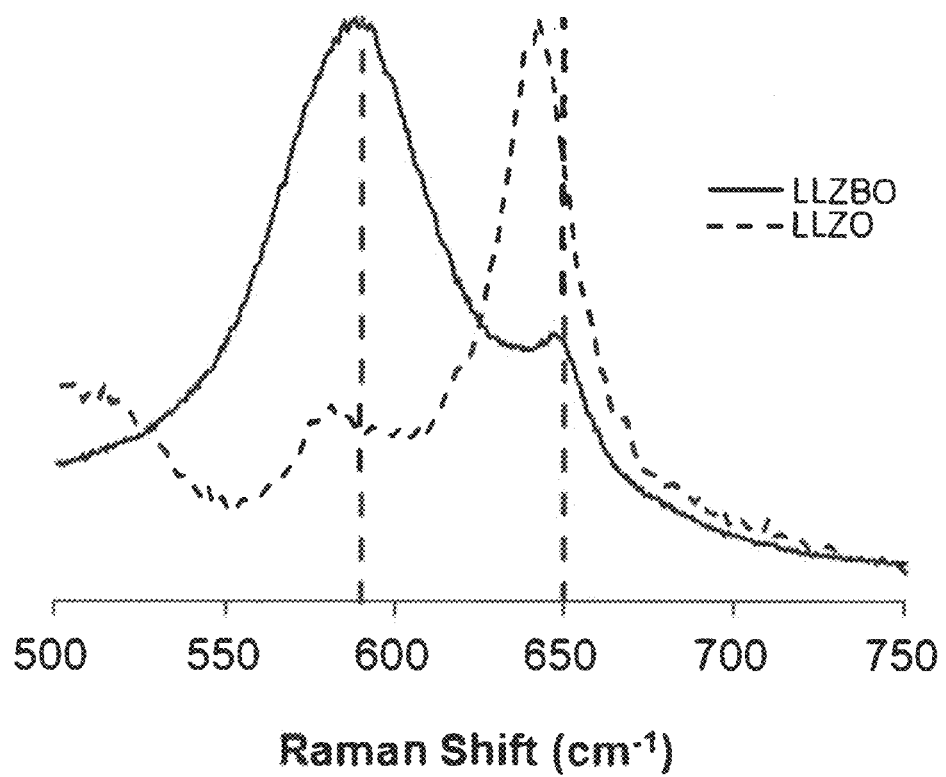
FIG. 6 is a graph depicting Raman Spectra for a phase pure LLZBO pellet hot-pressed at 850° C. The spectra for an Al-stabilized LLZO pellet is shown as a reference.
Figure 7:
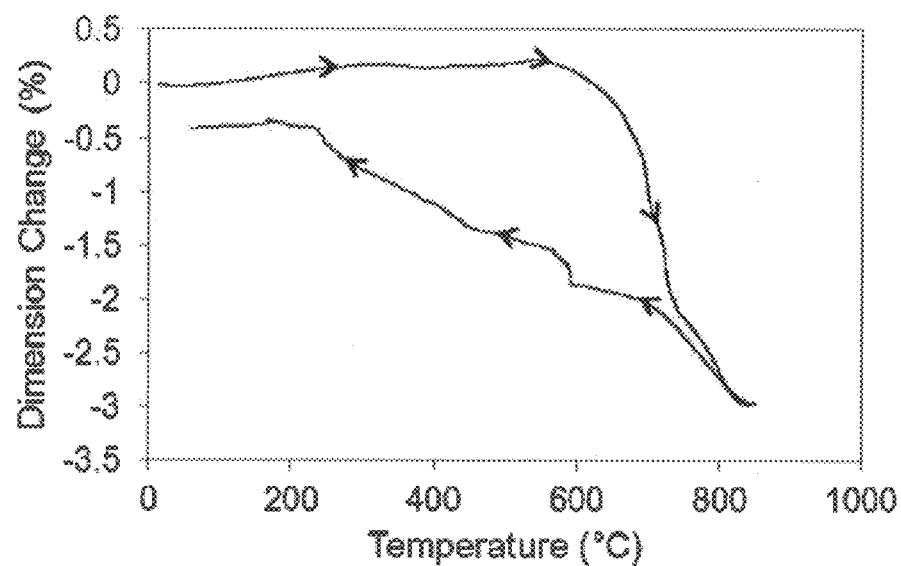
FIG. 7 is a graph depicting the relative change in pellet height as a function of temperature. The arrows depict the thermal history.

The Raman spectra shown in FIG. 6 was collected for the phase pure 850° C. hot-pressed sample, as well as Al-stabilized LLZO pellet for reference. Previous investigations of the Raman spectra for LLZO and LLBO have been reported [Ref. 9, 16]. These studies report that the band at 650 cm$^{-1}$ is related to the stretching of Zr—O bonds while the band at 590 cm$^{-1}$ is related to the stretching of Bi—O bonds. This is also consistent with the calculated lattice parameter from the XRD spectra of the phase pure 850° C. sample. The increase in the lattice parameter, the presence of both the Bi—O and Zr—O Raman bands, and the homogeneous distribution of both Zr and Bi are strong indications that the Bi is substituting on the Zr octahedral site (see FIGS. 6 and 7).

Thermomechanical Analysis

This Example reports the investigation of LLZBO synthesized by a pressure-assisted densification method. The low densification temperature in Bi-containing garnets may be due to the presence of a "pseudo-liquid" phase that forms, due to the fact that Bi tends to form low melting point oxides [Ref. 18]. This liquid phase would not only allow for improved grain boundary sliding, but may also improve diffusive transport during the densification process.

Thermomechanical analysis was conducted to further elucidate the presence of a liquid phase. The results can be seen in the graph of FIG. 7. Drastic dilation was observed beginning around 650° C. and it is evident that the majority of the densification for this system occurs between 600° C.-800° C., which is more than 200° C. lower than the densification temperatures for LLZO and other similar garnets. It can be seen that even with a negligible load applied, there is a dramatic onset of densification at significantly lower temperatures.

Due to the reactivity of the LLZBO with common crucible materials for thermal analysis, a "pseudo-dilatometry" experiment was used to estimate the melting temperature, which was estimated to be within the range of 1050° C.-1100° C. This melting temperature is significantly lower than other garnet systems, such as yttrium aluminum garnets (YAG) and gadolinium gallium garnets (GGG), which have melting temperatures of 1940° C. and 1750° C., respectively [Ref. 22, 23]. Considering the pseudo-phase diagram of the garnet system consisting of the $Li_2O$, $La_2O_3$, and $ZrO_2$ binary phases, the melting temperature should correlate with the melting temperature of each component. In the LLZBO system, since the melting temperatures of bismuth oxides are significantly lower than $Li_2O$, $La_2O_3$, and $ZrO_2$, it is reasonable that the overall melting temperature of the LLZBO system will also be significantly lower than that of the LLZO system. We hypothesize that the densification temperature appropriately scales with the melting temperature of the overall system, and therefore since the addition of the Bi substitution lowers the melting temperature, it also lowers the densification temperature.

Ionic Transference Number

Figure 8A:
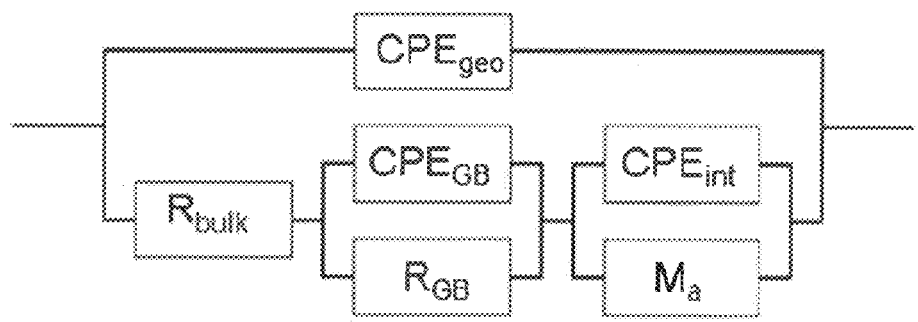
FIG. 8A depicts a schematic of the equivalent circuit used for fitting of the impedance spectra.

Electrochemical impedance spectroscopy was conducted on each hot-pressed sample. To determine the ionic conductivity, the impedance spectra were modeled using a modified version of the equivalent circuit proposed by Huggins [Ref. 24]. As in the Huggins model, a resistive element was used to represent the impedance of the bulk material, the grain boundary, and the interface. The capacitive elements that are used in the Huggins model were replaced by constant phase elements (CPEs) to accommodate variations in the time constants. The resulting equivalent circuit is depicted in FIG. 8A. The EIS spectra were fit to this equivalent circuit and each component of the spectra was assigned a physical phenomenon based off of the calculated capacitance value, with capacitance values of $10^{-12}$ F and $10^{-8}$ F indicating the bulk component and grain boundary component, respectively [Ref. 25].

Figure 8B:
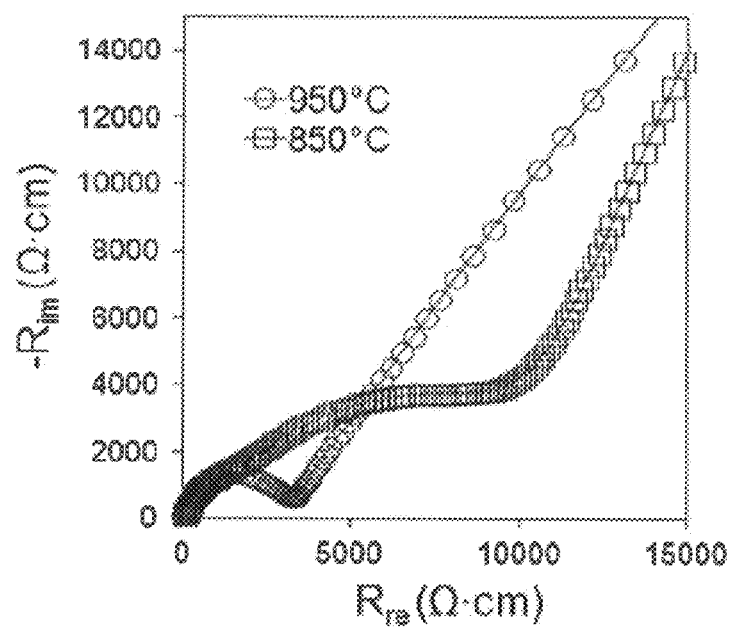
FIG. 8B depicts impedance spectra for LLZBO hot-pressed at 850° C. and 950° C.
Figure 8C:
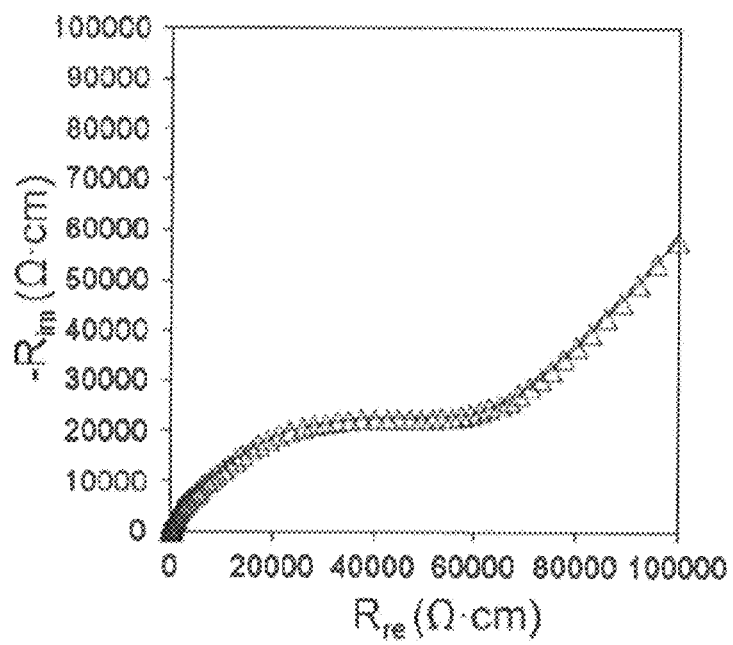
FIG. 8C depicts impedance spectra for LLZBO hot-pressed at 750° C.
Figure 8D:
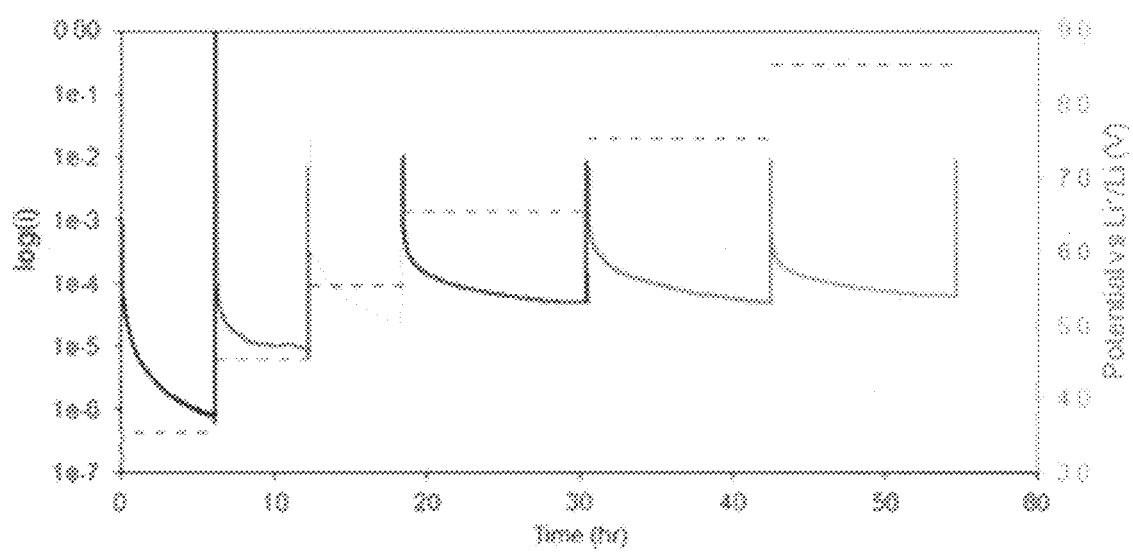
FIG. 8D shows example chronoamperometry measurement for LLZBO hot-pressed at 850° C.

FIGS. 8B-8C show the impedance spectra for LLZBO hot-pressed at 750° C., 850° C., and 950° C.; FIG. 8D shows chronoamperometry measurement for LLZBO hot-pressed at 850° C.; and a summary of the physical properties and the ionic resistances of LLZBO hot-pressed at 750° C., 850° C., and 950° C. is provided in Table 1.

the lowest density 750° C. sample was the highest for both the bulk ($R_{bulk}$) and grain boundary ($R_{GB}$) components. The high bulk resistance is likely due to the low relative density while the high grain boundary resistance is likely due to the poor grain boundary adhesion seen under SEM. The bulk resistance of the 850° C. sample was the lowest, which can be attributed to the combination of high relative density and high phase purity. On the contrary, the 950° C. sample had a slightly higher bulk resistance. Although the higher relative density correlates to a lower bulk resistance, the larger amount of impurities likely increased the resistance. However, it was also observed that the grain boundary resistance of the 950° C. sample was significantly lower than both the 750° C. and 850° C. samples, which is consistent with the trend of increasing intergranular fracture with increasing temperature that was observed under SEM. Intragranular fracture, as opposed to intergranular fracture, is an indication of strong grain boundary adhesion and a high degree of contact area, which enhances ionic transport between grains. This results in a correlation between a high degree of intragranular fracture and high grain boundary conductivity which has also been observed in other garnet systems [Refs. 20, 26].

Figure 9:
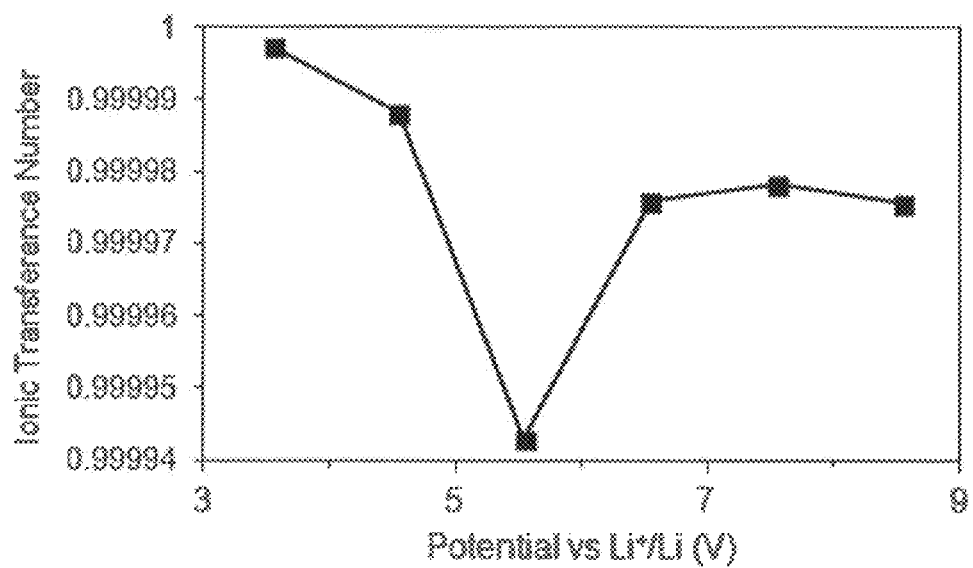
FIG. 9 is a graph depicting the experimental ionic transference number of LLZBO hot-pressed at 850° C. as a function of the applied potential.

The electronic conductivity was determined by chronoamperometry from 3.5 V to 8.5 V vs Li/Li$^+$ and was used to measure the ionic transference number for the phase pure 850° C. sample. For the blocking electrode set-up used, the initial transient region of the current response represents the combined current contributions of both ionic and electronic transport. As the supply of mobile ions is depleted, the current becomes dominated by the electronic current and therefore the steady state is representative of solely the electronic current. Using these steady state values, the average electronic conductivity was measured to be 8.2× $10^{-10}$ S/cm, which is approximately the same as reported values for LLZO [Ref. 27]. The ionic transference number as a function of potential is shown in FIG. 9. It was observed that the transference number is nearly equal to 1 in the entire potential window, which indicates that the majority of the conductance is caused by ionic transport rather than electron transport. A small dip in the transference number was observed near 5.5 V vs Li/Li$^+$, which was also observed in similar studies for Ta-stabilized LLZO [Ref. 27]. The dip at this potential may be an indication of hole injection into the LLZO valence band maximum.

In this Example, it has been demonstrated that through a hot-pressing approach, high density, phase pure LLZBO can

TABLE 1

| Hot-Pressing Temperature | Relative Density | Fraction of Impurity Phases | Average Grain Size | $R_{bulk}$ | $R_{GB}$ | $R_{total}$ | $\sigma_{bulk}$ | $\sigma_{total}$ |
|---|---|---|---|---|---|---|---|---|
| 750° C. | 90% | 2% | 3.1 μm | 5.34 kΩ · cm | 80.5 kΩ · cm | 85.9 kΩ · cm | 0.187 mS/cm | 0.0116 mS/cm |
| 850° C. | 94% | 0% | 3.6 μm | 2.12 kΩ · cm | 7.21 kΩ · cm | 9.33 kΩ · cm | 0.472 mS/cm | 0.107 mS/cm |
| 950° C. | 98% | 28% | 5.1 μm | 2.50 kΩ · cm | 2.32 kΩ · cm | 4.82 kΩ · cm | 0.400 mS/cm | 0.207 mS/cm |

For the phase pure 850° C. sample, the total resistance ($R_{total}$) was measured to be 9.33 kΩ·cm, which corresponds to a conductivity (σ) of 0.107 mS·cm$^{-1}$. This ionic conductivity is comparable to the conductivities reported for LLZO samples of similar densities, and higher than conductivities reported for LLBO samples [Ref. 12, 13]. The resistance of be fabricated at temperatures significantly lower than possible for other garnet systems. The high density and high phase purity have shown to contribute to a relatively high ionic conductivity compared to previous reports for Bi garnets. Furthermore, the conductivities measured here are comparable to the conductivities reported for other compositions of cubic LLZO, sintered at temperatures above 1000° C. The study presented here focuses on one example composition of the LLZBO garnet family, but other hot-pressing conditions or Bi content may maximize the conductivity and minimize the densification temperature.

CONCLUSIONS

In this Example, we demonstrated the synthesis of $Li_6La_3ZrBiO_{12}$ by a hot-pressing method. We achieved surprisingly good phase purity and higher relative densities compared to pressure-less sintering methods at similar processing temperatures. Analysis under EDS and Raman spectroscopy shows good incorporation of the Bi dopant into the garnet structure. SEM of both the polished surfaces and fracture surfaces are consistent with geometric density calculations and show strong grain boundary adhesion, as evidenced by the domination of intragranular fracture. Without intending to be bound by theory, the high total ionic conductivity (0.1 mS/cm) reported may be caused by the improved density and grain boundary adhesion. The reported electronic conductivity of $8 \times 10^{-10}$ S/cm in this Example also suggests that the ionic transference number is near unity. Furthermore, thermomechanical analysis was conducted to provide insight into the low temperature densification properties. It was observed that rapid densification begins to occur around 650° C., which is hypothesized without intending to be bound by theory to be a consequence of the low melting temperature of the LLZBO system. Improving the density of ion conducting ceramic oxides at lower temperatures is an important requirement for the scalability of solid state electrolytes. We have demonstrated in this Example the capability of Bi-containing garnets to achieve similar conductivities and densities of typical LLZO at significantly lower densification temperatures in a continued effort to successfully integrate garnet solid electrolytes into all solid state Li-ion batteries and lithium metal batteries.

REFERENCES

[1] R. Murugan, V. Thangadurai, W. Weppner, Fast Lithium Ion Conduction in Garnet-Type $Li_7La_3Zr_2O_{12}$, Angew. Chem. Int. Ed. 46 (2007) 7778-7781. doi:10.1002/anie.200701144.

[2] V. Thangadurai, S. Narayanan, D. Pinzaru, Garnet-type solid-state fast Li ion conductors for Li batteries: critical review, Chem. Soc. Rev. 43 (2014) 4714-4727. doi: 10.1039/C4CS00020J.

[3] T. Thompson, A. Sharafi, M. D. Johannes, A. Huq, J. L. Allen, J. Wolfenstine, J. Sakamoto, A Tale of Two Sites: On Defining the Carrier Concentration in Garnet-Based Ionic Conductors for Advanced Li Batteries, Adv. Energy Mater. 5 (2015) 1500096. doi:10.1002/aenm.201500096.

[4] J.-M. Tarascon, M. Armand, Issues and challenges facing rechargeable lithium batteries, Nature. 414 (2001) 359-367. doi:10.1038/35104644.

[5] J. B. Goodenough, Y. Kim, Challenges for Rechargeable Li Batteries[†], Chem. Mater. 22 (2010) 587-603. doi: 10.1021/cm901452z.

[6] J. L. Allen, J. Wolfenstine, E. Rangasamy, J. Sakamoto, Effect of substitution (Ta, Al, Ga) on the conductivity of $Li_7La_3Zr_2O_{12}$, J. Power Sources. 206 (2012) 315-319. doi:10.1016/j.jpowsour.2012.01.131.

[7] L. J. Miara, S. P. Ong, Y. Mo, W. D. Richards, Y. Park, J.-M. Lee, H. S. Lee, G. Ceder, Effect of Rb and Ta Doping on the Ionic Conductivity and Stability of the Garnet $Li_7+2x-y(La_{3-x}Rb_x)(Zr_{2-y}Ta_y)O12$ ($0 \leq x \leq 0.375$, $0 \leq y \leq 1$) Superionic Conductor: A First Principles Investigation, Chem. Mater. 25 (2013) 3048-3055. doi:10.1021/cm401232r.

[8] E. Rangasamy, J. Wolfenstine, J. Allen, J. Sakamoto, The effect of 24c-site (A) cation substitution on the tetragonal-cubic phase transition in $Li_{7-x}La_{3-x}A_xZr_2O_{12}$ garnet-based ceramic electrolyte, J. Power Sources. 230 (2013) 261-266. doi:10.1016/j.jpowsour.2012.12.076.

[9] T. Thompson, J. Wolfenstine, J. L. Allen, M. Johannes, A. Huq, I. N. David, J. Sakamoto, Tetragonal vs. cubic phase stability in Al-free Ta doped $Li_7La_3Zr_2O_{12}$ (LLZO), J. Mater. Chem. A. 2 (2014) 13431-13436. doi:10.1039/C4TA02099E.

[10] Y. Xia, L. Ma, H. Lu, X.-P. Wang, Y.-X. Gao, W. Liu, Z. Zhuang, L.-J. Guo, Q.-F. Fang, Preparation and enhancement of ionic conductivity in Al-added garnet-like $Li_{6.8}La_3Zr_{1.8}Bi_{0.2}O_{12}$ lithium ionic electrolyte, Front. Mater. Sci. 9 (2015) 366-372. doi:10.1007/s11706-015-0308-6.

[11] S. Teng, J. Tan, A. Tiwari, Recent developments in garnet based solid state electrolytes for thin film batteries, Curr. Opin. Solid State Mater. Sci. 18 (2014) 29-38. doi:10.1016/j.cossms.2013.10.002.

[12] R. Murugan, W. Weppner, P. Schmid-Beurmann, V. Thangadurai, Structure and lithium ion conductivity of bismuth containing lithium garnets Li5La3Bi2O12 and $Li_6SrLa_2Bi_2O_{12}$, Mater. Sci. Eng. B. 143 (2007) 14-20. doi:10.1016/j.mseb.2007.07.009.

[13] Y. X. Gao, X. P. Wang, W. G. Wang, Z. Zhuang, D. M. Zhang, Q. F. Fang, Synthesis, ionic conductivity, and chemical compatibility of garnet-like lithium ionic conductor $Li_5La_3Bi_2O_{12}$, Solid State Ion. 181 (2010) 1415-1419. doi:10.1016/j.ssi.2010.08.012.

[14] H. Peng, L. Xiao, Y. Cao, X. Luan, Synthesis and ionic conductivity of $Li_6La_3BiSnO_{12}$ with cubic garnet-type structure via solid-state reaction, J. Cent. South Univ. 22 (2015) 2883-2886. doi:10.1007/s11771-015-2821-2.

[15] H. Peng, Y. Zhang, L. Li, L. Feng, Effect of quenching method on Li ion conductivity of $Li_5La_3Bi_2O_{12}$ solid state electrolyte, Solid State Ion. 304 (2017) 71-74. doi: 10.1016/j.ssi.2017.03.030.

[16] R. Wagner, D. Rettenwander, G. J. Redhammer, G. Tippelt, G. Sabathi, M. E. Musso, B. Stanje, M. Wilkening, E. Suard, G. Amthauer, Synthesis, Crystal Structure, and Stability of Cubic $Li_{7-x}La_3Zr_{2-x}Bi_xO_{12}$, Inorg. Chem. 55 (2016) 12211-12219. doi:10.1021/acs.inorgchem.6b01825.

[17] D. K. Schwanz, E. Marinero, Low Temperature Synthesis of Cubic-phase Fast-ionic Conducting Bi-doped Garnet Solid State Electrolytes, in: 2016. http://ads-abs.harvard.edu/abs/2016APS . . . MARH54010S.

[18] D. K. Schwanz, E. E. Marinero-Caceres, Solid-state electrolytes and batteries made therefrom, and methods of making solid-state electrolytes, US20160133990 A1, [19] I. N. David, T. Thompson, J. Wolfenstine, J. L. Allen, J. Sakamoto, Microstructure and Li-Ion Conductivity of Hot-Pressed Cubic $Li_7La_3Zr_2O_{12}$, J. Am. Ceram. Soc. 98 (2015) 1209-1214. doi:10.1111/jace.13455.

[20] Y. Kim, H. Jo, J. L. Allen, H. Choe, J. Wolfenstine, J. Sakamoto, The Effect of Relative Density on the Mechanical Properties of Hot-Pressed Cubic $Li_7La_3Zr_2O_{12}$, J. Am. Ceram. Soc. 99 (2016) 1367-1374. doi:10.1111/jace.14084.

[21] E. Rangasamy, J. Wolfenstine, J. Sakamoto, The role of Al and Li concentration on the formation of cubic garnet

[22] J. L. Caslaysky, D. J. Viechnicki, Melting behaviour and metastability of yttrium aluminium garnet (YAG) and YAlO$_3$ determined by optical differential thermal analysis, J. Mater. Sci. 15 (1980) 1709-1718. doi:10.1007/BF00550589.

[23] Q. Xiao, J. J. Derby, Heat transfer and interface inversion during the Czochralski growth of yttrium aluminum garnet and gadolinium gallium garnet, J. Cryst. Growth. 139 (1994) 147-157. doi:10.1016/0022-0248(94)90039-6.

[24] R. A. Huggins, Simple method to determine electronic and ionic components of the conductivity in mixed conductors a review, Ionics. 8 (2002) 300-313.

[25] Irvine J T S, Sinclair D C, West A R (1990) Electroceramics: characterization by impedance spectroscopy. Adv Mater 2(3):132-138. https://doi.org/10.1002/adma.19900020304

[26] Wolfenstine J, Ratchford J, Rangasamy E et al (2012) Synthesis and high Li-ion conductivity of Ga-stabilized cubic Li$_7$La$_3$Zr$_2$O$_{12}$. Mater Chem Phys 134(2-3):571-575. https://doi.org/10.1016/j.matchemphys.2012.03.054

[27] T. Thompson, S. Yu, L. Williams, R. D. Schmidt, R. Garcia-Mendez, J. Wolfenstine, J. L. Allen, E. Kioupakis, D. J. Siegel, J. Sakamoto, Electrochemical Window of the Li-Ion Solid Electrolyte Li$_7$La$_3$Zr$_2$O$_{12}$, ACS Energy Lett. 2 (2017) 462-468. doi:10.1021/acsenergylett.6b00593.

The citation of any document or reference is not to be construed as an admission that it is prior art with respect to the present invention.

Thus, the present invention provides a ceramic garnet based ionically conducting material that can be used as a solid state electrolyte for an electrochemical device such as a battery or supercapacitor. Cubic garnet Li$_7$La$_3$Zr$_2$O$_{12}$ (LLZO) and similar compositions of fast ion-conducting solid-state electrolytes have shown great potential for the development of high-energy-density solid-state Li-ion batteries. Although these materials have shown unprecedented ionic conductivities and chemical stability, these materials require high processing temperatures for synthesis. For many of the common compositions of LLZO, temperatures above 1000° C. are required to form the cubic garnet phase and to achieve high conductivities. Therefore, lowering the processing temperatures of these materials as described herein is of great interest for the purposes of scalability and fabrication. A Bi co-dopant not only stabilizes the cubic garnet phase but also lowers the densification temperature.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for forming a solid state electrolyte, the method comprising:
   (a) combining a first solid comprising lithium, a second solid comprising lanthanum; a third solid comprising zirconium, and a fourth solid comprising bismuth to form a mixture; and
   (b) applying simultaneous heat and pressure to the mixture to form a ceramic material, wherein the ceramic material has a relative density above 90%,
   wherein the ceramic material has a stoichiometric chemical formula of Li$_{7-x}$La$_3$Zr$_{2-x}$Bi$_x$O$_{12}$, and x has a value between 0.75 and 1,
   wherein the heat is applied at a temperature between 650 and 900 degrees Celsius, and
   wherein the pressure applied is between 40 and 60 MPa.

2. The method of claim 1, wherein step (b) comprises using a hot-pressing technique.

3. The method of claim 2, wherein the hot-pressing technique uses at least one of induction heating, indirect resistance heating, or direct hot-pressing.

4. The method of claim 1, wherein the first solid comprises a lithium oxide or a lithium salt.

5. The method of claim 1, wherein the first solid comprises lithium carbonate.

6. The method of claim 1, wherein the second solid comprises a lanthanum oxide or a lanthanum salt.

7. The method of claim 1, wherein the second solid comprises lanthanum hydroxide.

8. The method of claim 1, wherein the third solid comprises a zirconium oxide or a zirconium salt.

9. The method of claim 1, wherein the third solid comprises zirconium dioxide.

10. The method of claim 1, wherein the fourth solid comprises a bismuth oxide or a bismuth salt.

11. The method of claim 1, wherein the fourth solid comprises bismuth oxide.

12. The method of claim 1, wherein the ceramic material has a relative density above 94%.

13. The method of claim 1, wherein the ceramic material has a total ionic conductivity above 0.1 mS/cm.

14. The method of claim 1, wherein the ceramic material has an ionic transference number of above 0.99990 when measured with chronoamperometry voltages between 2 and 10 Volts.

15. The method of claim 1, wherein the ceramic material has a garnet-type or garnet-like crystal structure.

16. The method of claim 1, wherein combining the solids involves mixing dry powders and cold-pressing and calcining the mixed dry powders.

17. The method of claim 16, wherein the calcining process occurs at temperatures between 500-1000 degrees Celsius for 2-8 hours.

18. The method of claim 1, wherein simultaneous heat and pressure are applied for less than 2 hours.

19. The method of claim 1, wherein bismuth substitutes into an LLZO structural framework of the solid state electrolyte.

20. An electrochemical device comprising:
   a cathode;
   an anode; and
   a solid-state electrolyte formed by the method of claim 1.

21. The electrochemical device of claim 20, wherein the cathode comprises a lithium host material selected from the group consisting of lithium metal oxides wherein the metal is one or more of aluminum, cobalt, iron, manganese, nickel and vanadium, and lithium-containing phosphates having a general formula LiMPO$_4$ wherein M is one or more of cobalt, iron, manganese, and nickel.

22. The electrochemical device of claim 20, wherein the anode comprises a lithium host material is selected from the group consisting of graphite, lithium titanium oxides, hard carbon, tin/cobalt alloy, and silicon/carbon.

23. The electrochemical device of claim 20, wherein the anode comprises a lithium metal.

* * * * *